United States Patent
Yamazaki et al.

(10) Patent No.: US 9,178,458 B2
(45) Date of Patent: Nov. 3, 2015

(54) CONTROLLER OF AC MOTOR

(71) Applicant: KABUSHIKI KAISHA YASKAWA DENKI, Kitakyushu-shi (JP)

(72) Inventors: Akira Yamazaki, Kitakyushu (JP); Hideaki Iura, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 67 days.

(21) Appl. No.: 14/044,875

(22) Filed: Oct. 3, 2013

(65) Prior Publication Data

US 2014/0125261 A1 May 8, 2014

(30) Foreign Application Priority Data

Nov. 5, 2012 (JP) ................................. 2012-243949

(51) Int. Cl.
*H02P 21/00* (2006.01)

(52) U.S. Cl.
CPC ........ *H02P 21/0039* (2013.01); *H02P 21/0003* (2013.01); *H02P 21/0085* (2013.01); *H02P 21/0089* (2013.01)

(58) Field of Classification Search
CPC ....................................................... H02P 21/00
USPC .................. 318/400.02, 635, 71, 108, 400.2, 318/400.22, 718, 479
See application file for complete search history.

(56) References Cited

U.S. PATENT DOCUMENTS

| | | | | |
|---|---|---|---|---|
| 5,689,166 A | * | 11/1997 | Nagayama et al. | ........... 318/721 |
| 5,877,607 A | * | 3/1999 | Masaki et al. | ................. 318/807 |
| 2003/0090231 A1 | * | 5/2003 | Yoshimoto et al. | ........... 318/635 |
| 2004/0183496 A1 | * | 9/2004 | Yoshimoto | ..................... 318/715 |
| 2005/0264255 A1 | * | 12/2005 | Maruyama et al. | ........... 318/808 |
| 2006/0061310 A1 | * | 3/2006 | Takai et al. | .................... 318/139 |
| 2007/0222409 A1 | * | 9/2007 | Kariatsumari et al. | ........ 318/807 |
| 2009/0128081 A1 | * | 5/2009 | Yoneda et al. | ................. 318/689 |
| 2011/0031907 A1 | * | 2/2011 | Takahashi | ...................... 318/139 |
| 2011/0080125 A1 | * | 4/2011 | Shimada et al. | ......... 318/400.09 |
| 2012/0194113 A1 | * | 8/2012 | Lee et al. | ................. 318/400.33 |

FOREIGN PATENT DOCUMENTS

JP     2010-022165     1/2010

* cited by examiner

*Primary Examiner* — Eduardo Colon Santana
*Assistant Examiner* — Iftekhar Mustafa
(74) *Attorney, Agent, or Firm* — Mori & Ward, LLP

(57) ABSTRACT

A controller of an AC motor includes a d-axis voltage command section to generate a d-axis voltage command on a d axis of a d-q coordinate system. A d-axis non-interactive control section removes, from the d-axis voltage command, an interference component resulting from a current on a q axis of the system. A first current deviation arithmetic section obtains a deviation between a current command on the q axis and the current on the q axis flowing through the AC motor. A q-axis integral control section outputs an integral value of the deviation. A q-axis voltage command section generates a q-axis voltage command based on the deviation. A constant output control section outputs a correction voltage command based on the integral value. A d-axis voltage command correction section subtracts the correction voltage command from the d-axis voltage command after non-interactive control to correct the d-axis voltage command.

13 Claims, 10 Drawing Sheets

CONTROLLER OF AC MOTOR

CROSS-REFERENCE TO RELATED APPLICATIONS

The present application claims priority under 35 U.S.C. §119 to Japanese Patent Application No. 2012-243949, filed Nov. 5, 2012. The contents of this application are incorporated herein by reference in their entirety.

BACKGROUND

1. Field of the Invention

The present invention relates to a controller of an AC motor.

2. Discussion of the Background

In controllers of AC (alternating current) motors, their driving control in a constant output region is generally the control of setting a current command on the d axis, which is parallel to the flux of the AC motor, into the negative direction, thereby weakening the flux. This control is also referred to as voltage limiting control (see, for example, Japanese Unexamined Patent Application Publication No. 2010-022165).

SUMMARY

According to one aspect of the present invention, a controller of an AC motor includes a d-axis voltage command section, a d-axis non-interactive control section, a first current deviation arithmetic section, a q-axis integral control section, a q-axis voltage command section, a constant output control section, and a d-axis voltage command correction section. The d-axis voltage command section is configured to generate a d-axis voltage command on a d axis of a d-q coordinate system. The d axis is parallel to a flux of the AC motor and orthogonal to a q axis of the d-q coordinate system. The d-axis non-interactive control section is configured to remove, from the d-axis voltage command, an interference component resulting from a current on the q axis. The first current deviation arithmetic section is configured to perform an arithmetic operation to obtain a q-axis current deviation between a current command on the q axis and the current on the q axis flowing through the AC motor. The q-axis integral control section is configured to receive the q-axis current deviation and output an integral value of the q-axis current deviation. The q-axis voltage command section is configured to generate a q-axis voltage command on the q axis based on the q-axis current deviation and is configured to output the q-axis voltage command. The constant output control section is configured to output a correction voltage command relative to the d-axis voltage command based on an output of the q-axis integral control section. The d-axis voltage command correction section is configured to subtract the correction voltage command from the d-axis voltage command after the d-axis non-interactive control section has performed non-interactive control, so as to correct the d-axis voltage command.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

Embodiments of a controller of an AC motor (hereinafter referred to as "motor controller") disclosed in the present application will be described in detail below by referring to the accompanying drawings. The following embodiments are provided for exemplary purposes only and are not intended in a limiting sense.

First Embodiment

Figure 1:
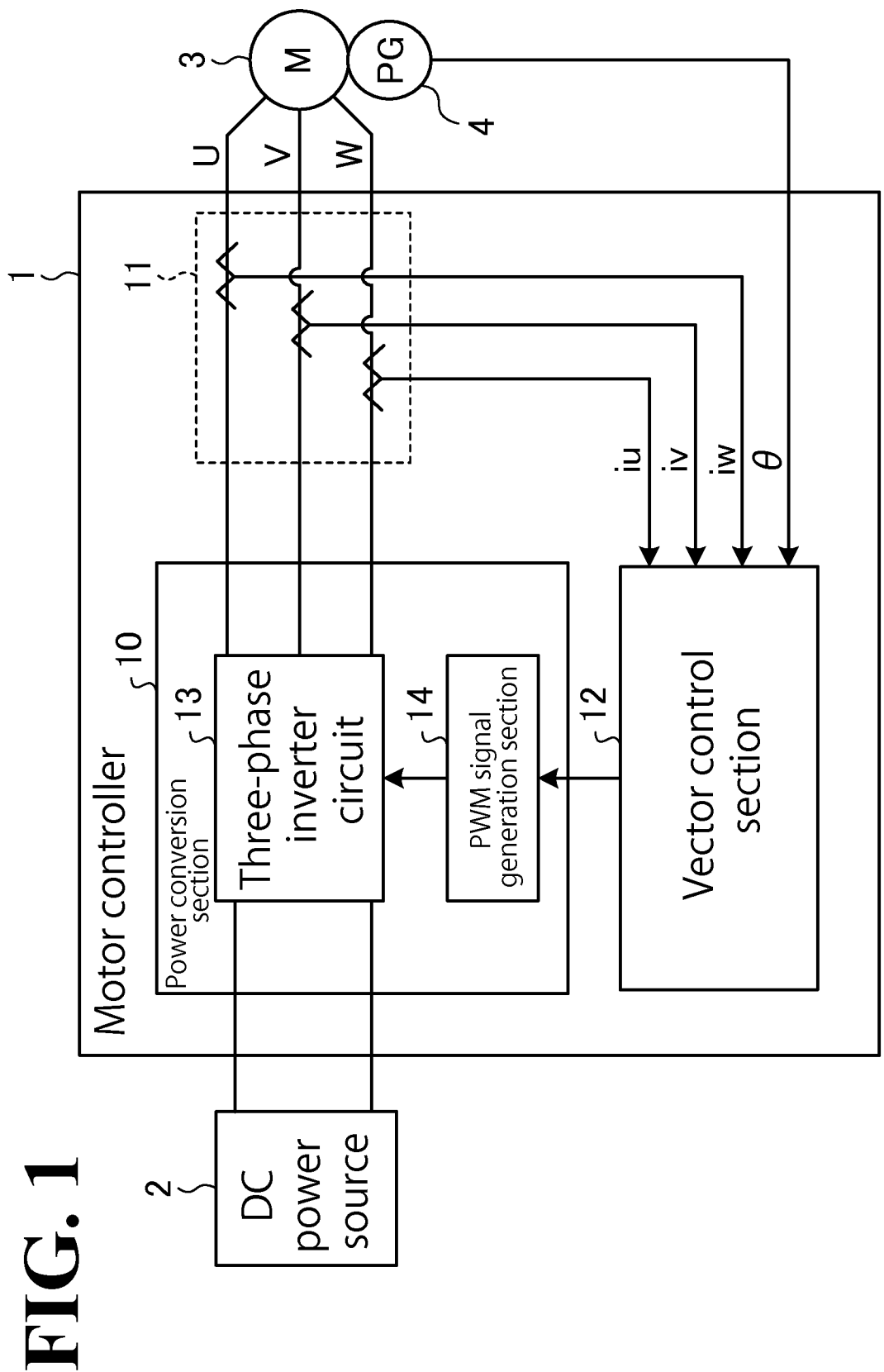
FIG. 1 is a diagram illustrating a controller of an AC motor according to a first embodiment.

First, a motor controller according to the first embodiment will be described. FIG. 1 is a diagram illustrating the motor controller according to this embodiment.

As shown in FIG. 1, a motor controller 1 according to the first embodiment includes a power conversion section 10, a current detection section 11, and a vector control section 12. The motor controller 1 subjects DC (direct current) power supplied from the DC power source 2 to known PWM (Pulse Width Modulation) control, thereby converting the DC power into three-phase AC power of desired frequency and voltage, and outputs the three-phase AC power to a three-phase AC motor 3 (hereinafter referred to as a motor 3). An example of the motor 3 is a permanent magnet synchronous motor.

The power conversion section 10 includes a three-phase inverter circuit 13 and a PWM signal generation section 14. The three-phase inverter circuit 13 is coupled between the DC power source 2 and the motor 3. The three-phase inverter circuit 13 is made up of, for example, six switching elements in three-phase bridge connection. Based on a control signal from the vector control section 12, the PWM signal generation section 14 generates a PWM signal to turn on and off the switching elements constituting the three-phase inverter circuit 13, and outputs the PWM signal to the three-phase inverter circuit 13. The configuration of the DC power source 2 may also be to convert AC power into DC power and output the DC power, examples including a combination of a rectifier circuit of diode and a smoothing capacitor that smoothes out DC output voltage. In this case, an AC power source is coupled to the input side of the rectifier circuit.

The current detection section 11 detects current flowing between the power conversion section 10 and the motor 3. Specifically, the current detection section 11 detects instantaneous values iu, iv, and iw of the currents flowing between the power conversion section 10 and a U phase, a V phase, and a W phase of the motor 3 (the instantaneous values being hereinafter referred to as output currents iu, iv, and iw). An example of the current detection section 11 is a current sensor that detects current using a Hall device, which is a magneto-electric converting device.

The vector control section 12 generates a control signal and outputs the control signal to the power conversion section 10. The control signal is based on the output currents iu, iv, and iw detected by the current detection section 11 and based on a rotor electrical angle phase θ of the motor 3 detected by a position detection section 4 (the electrical angle being defined as the mechanical angle of the rotor of the motor 3 multiplied by the number of magnetic pole pairs of the motor 3, which applies throughout the description that follows). In a d-q coordinate system in which an axis parallel to the flux of the motor 3 is a d axis and an axis having a direction orthogonal to the d axis is a q axis, the vector control section 12 divides the current components into a d-axis component and a q-axis component in performing vector control.

In the following description, the d-axis component and the q-axis component of the current command will be respectively referred to as a d-axis current command $i_d^*$ and a q-axis current command $i_q^*$, and the d-axis component and the q-axis component of the current flowing through the motor 3 will be respectively referred to as a d-axis current $i_{d\_fb}$ and a q-axis current $i_{q\_fb}$.

When the motor 3 is an IPM (Interior Permanent Magnet) motor, a voltage equation on the d-q coordinate system can be represented by Formula (1). While the following description will assume that the motor 3 is an IPM motor, the motor 3 will not be limited to the IPM motor. For example, when the motor 3 is an SPM (Surface Permanent Magnet) motor, then $L_d = L_q$.

$$\begin{bmatrix} v_d \\ v_q \end{bmatrix} = \begin{bmatrix} R + pL_d & -\omega L_q \\ \omega L_d & R + pL_q \end{bmatrix} \begin{bmatrix} i_d \\ i_q \end{bmatrix} + \begin{bmatrix} 0 \\ \omega\phi \end{bmatrix} \quad (1)$$

In Formula (1), $i_d$ and $i_q$ respectively denote the d-axis component and the q-axis component of the current flowing through the motor 3, and $V_d$ and $V_q$ respectively denote the d-axis component and the q-axis component of the voltage applied on the motor 3. Also, R denotes the coil resistance of the motor 3, $L_d$ denotes the d-axis inductance of the motor 3, $L_q$ denotes the q-axis inductance of the motor 3, ω denotes the electrical angular velocity of the motor 3, φ denotes an induced voltage constant, and p denotes a differential arithmetic section. It is noted that R, $L_d$, $L_q$, and φ are motor parameters.

Figure 2:
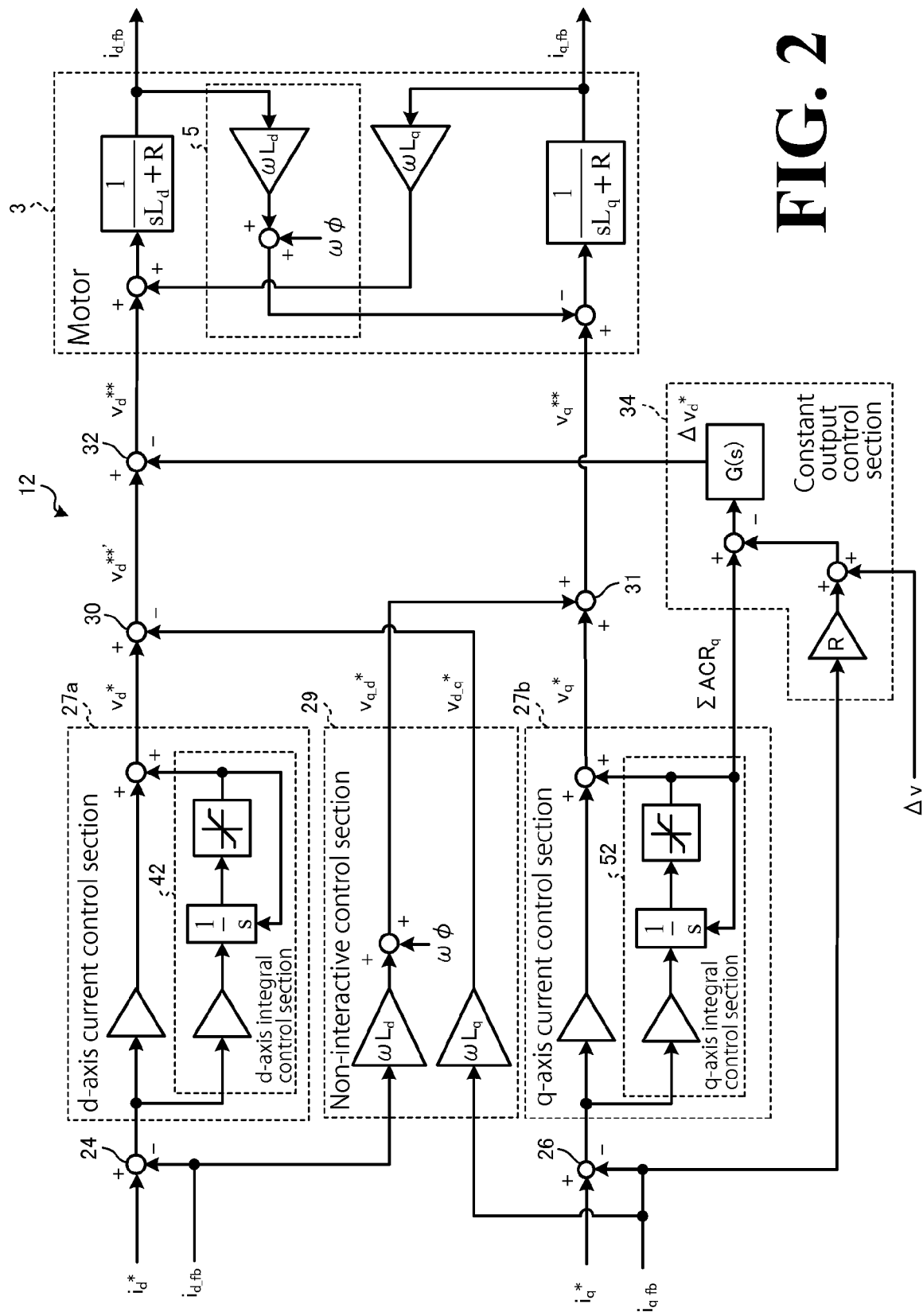
FIG. 2 is a block diagram illustrating a current control system including current control and non-interactive control executed at a vector control section shown in FIG. 1.

FIG. 2 is a block diagram illustrating a current control system including current control and non-interactive control executed at the vector control section 12. As shown in FIG. 2, the vector control section 12 includes subtraction sections 24, 26, 30, and 32, a d-axis current control section 27a, a q-axis current control section 27b, a non-interactive control section 29, an addition section 31, and a constant output control section 34.

The subtraction section 24 performs an arithmetic operation to obtain a d-axis current deviation, which is a deviation between the d-axis current command $i_d^*$ and the d-axis current $i_{d\_fb}$, and outputs the d-axis current deviation to the d-axis current control section 27a. The d-axis current control section 27a generates a d-axis voltage command $v_d^*$ based on the input d-axis current deviation. The subtraction section 26 performs an arithmetic operation to obtain a q-axis current deviation, which is a deviation between the q-axis current command $i_q^*$ and the q-axis current $i_{q\_fb}$, and outputs the q-axis current deviation to the q-axis current control section 27b. The q-axis current control section 27b generates a q-axis voltage command $v_q^*$ based on the q-axis current deviation.

The non-interactive control section 29 is provided to avoid interference between the d axis and the q axis. The non-interactive control section 29 generates a d-axis voltage compensation value $v_{d\_q}^*$ and a q-axis voltage compensation value $v_{q\_d}^*$ based on the d-axis current $i_{d\_fb}$, the q-axis current $i_{q\_fb}$, the electrical angular velocity ω, and the induced voltage constant φ, and outputs the d-axis voltage compensation value $v_{d\_q}^*$ and the q-axis voltage compensation value $v_{q\_d}^*$.

The constant output control section 34 subtracts, from an integral value $\Sigma ACR_q$ of the q-axis current deviation, a value obtained by multiplying the q-axis current $i_{q\_fb}$ by the coil resistance R as a coefficient, and based on this subtraction result, generates a correction voltage command $\Delta v_d^*$.

The subtraction section 30 subtracts the d-axis voltage compensation value $v_{d\_q}^*$ from the d-axis voltage command $v_d^*$, thereby generating a d-axis voltage command $v_d^{'}$. The subtraction section 32** subtracts the correction voltage command $\Delta v_d^*$ from the d-axis voltage command $v_d^{'}$, thereby generating a d-axis voltage command $v_d^{}$. The addition section 31 also adds the q-axis voltage compensation value $v_{q\_d}^*$ to the q-axis voltage command $v_q^*$, thereby generating a q-axis voltage command $v_q^{}$. The motor 3 is controlled based on the d-axis voltage command $v_d^{}$ and the q-axis voltage command $v_q^{**}$ generated in the above-described manners.

In the high velocity region of the motor 3, a relationship represented by Formula (2) is established. Hence, a dominating factor of the voltage saturation in the constant output region is the q-axis voltage command $v_q^{}$, which is a torque-axis voltage command. When the q-axis voltage command $v_q^{}$ becomes saturated, the current control of the q-axis current stops functioning, resulting in degraded torque responsivity.

$$|v_d| < |v_q| \quad (2)$$

When the above-described motor parameters have no errors and the non-interactive control section 29 accurately performs its control with the q-axis voltage command $v_q^{}$ in non-saturation state, then a q-axis integral control section 52, described later, of the q-axis current control section 27b only outputs an amount equivalent to the voltage drop that is due to the coil resistance R. When the q-axis voltage command $v_q^{}$ becomes saturated, the q-axis integral control section 52 increases its output. Hence, the difference between the output of the q-axis integral control section 52 and the amount equivalent to the voltage drop that is due to the coil resistance R indicates the degree of saturation of the q-axis voltage command $v_q^{**}$.

Incidentally, when the d-axis current $i_{d\_fb}$ exists in the current components flowing through the motor 3, an interference voltage is caused by the d-axis current $i_{d\_fb}$ on the q axis (an interference element 5 shown in FIG. 2), which has influence on the q-axis current $i_{q\_fb}$ to change. This is similarly true when the q-axis voltage command $v_q^{}$ is in saturation state. In view of this, the motor controller 1 corrects the d-axis voltage command $v_d^{'}$ to perform an increase-decrease operation of the d-axis current $i_{d\_fb}$. Using the interference voltage (the interference element 5 shown in FIG. 2) caused on the q axis by the d-axis current $i_{d\_fb}$ that has been increase-decrease operated, the motor controller 1 controls the q-axis current $i_{q\_fb}$.

Specifically, the motor controller 1 includes the constant output control section 34 to perform the control of generating the correction voltage command $\Delta v_d^*$ relative to the d-axis voltage command $v_d^{**'}$ based on the integral value $\Sigma ACR_q$ of the q-axis current deviation, and subtracting the correction voltage command $\Delta v_d^*$ from the d-axis voltage command $v_d^{'}$. This ensures control of the q-axis current $i_{q\_fb}$ even when the q-axis voltage command $v_q^{}$ is in saturation state. This, in turn, ensures setting the maximum output voltage to as high as its threshold limit value, which inhibits degradation of the voltage utilization ratio and which expands the range of the output voltage, thereby improving torque responsivity in the high velocity region. This will be further described below by referring to FIGS. 2 and 3.

In the block diagram shown in FIG. 2, it is assumed that the non-interactive control section 29 accurately performs its non-interactive control against an interference voltage ($=\omega L_q \times i_{q\_fb}$; see the motor 3 in FIG. 2) caused on the d axis by the q-axis current $i_{q\_fb}$. In this case, the interference voltage on the d axis and the d-axis voltage compensation value $v_{d\_q}^*$ can be assumed to cancel one another. Hence, in the constant output state, it is possible to omit the configuration associated with generation of the d-axis voltage compensation value $v_{d\_q}^*$ and the equivalent portion of the motor 3. The non-interactive control section 29 cancels the interference voltage occurring on the d axis, and this ensures that the constant output control section 34 sufficiently exhibits its functions of correcting the d-axis voltage command $v_{d\_q}^{*'}$ and controlling the q-axis current $i_{q\_fb}$. Additionally, the influence of the interference voltage on the d axis is cancelled, and this ensures that the d-axis current $i_{d\_fb}$ is sufficiently controlled even when the output range of the d-axis current control section 27a is limited to a small level by a limiter.

It is also assumed that with a limiter of a d-axis integral control section 42, described later, of the d-axis current control section 27a being set to have a low upper limit, the output of the d-axis integral control section 42 is saturated as indicated by a value on the limiter in the constant output state. In this case, the d-axis integral control section 42 can be omitted in the d-axis current control section 27a. Also in the constant output state, the q-axis voltage command $v_q^{**}$ is saturated, and the q-axis current control section 27b (excluding the q-axis integral control section 52) and the non-interactive control section 29 are stopping functioning on their q axis control. Hence, it is possible to omit this portion (which is the portion associated with generation of the q-axis voltage command $v_q^*$ and the q-axis voltage command $v_q^{**}$). Additionally, when a voltage error compensation section 33, described later (see FIG. 4), is provided, a voltage error $\Delta v$ obtained by the voltage error compensation section 33 is a voltage equivalent to an error in the parameters. Since the error is presumed to be normally zero, the voltage error compensation section 33 can also be omitted.

Figure 3:
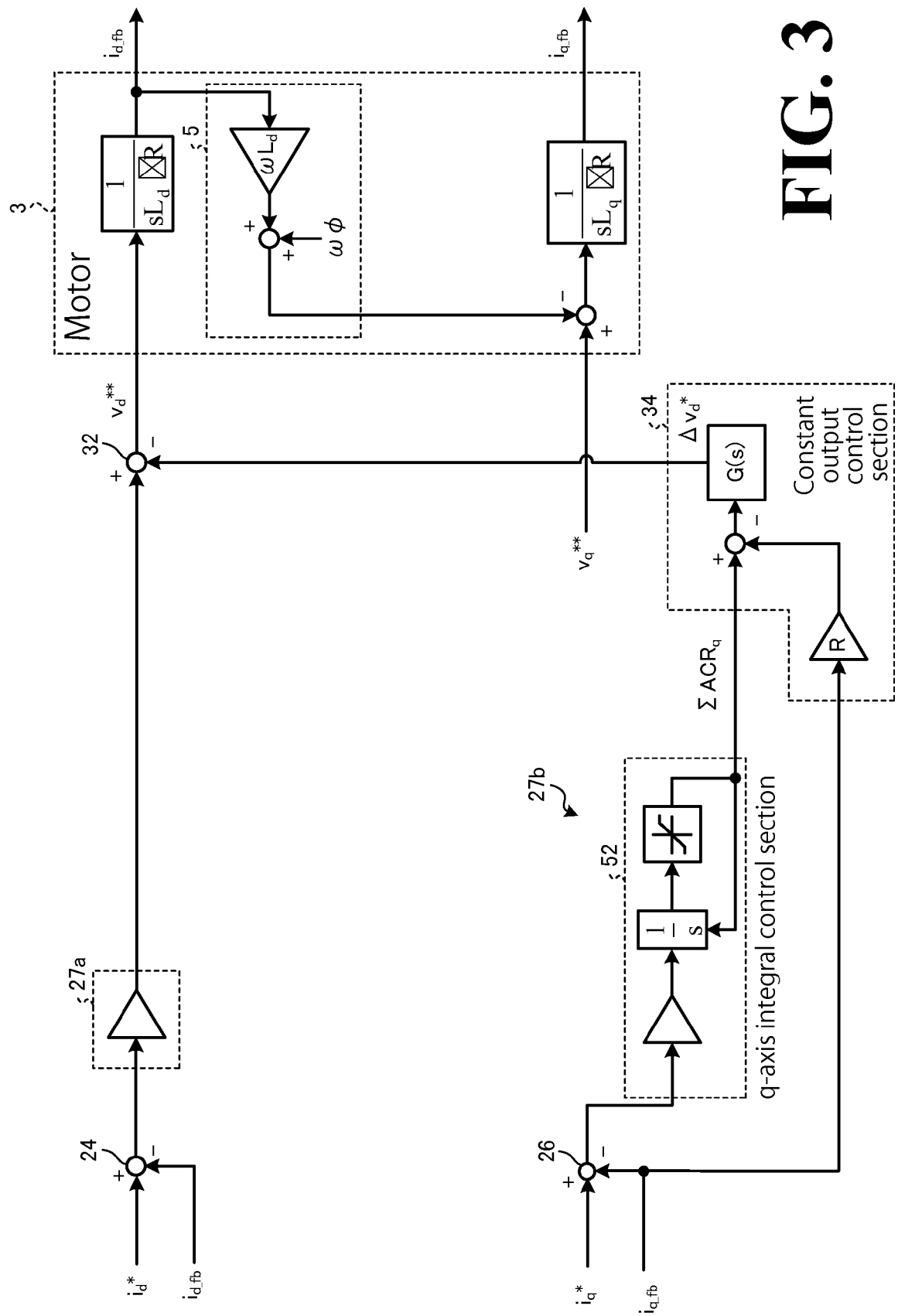
FIG. 3 is an approximation block diagram of the current control system in a constant output state.

Thus, the block diagram shown in FIG. 2 can be approximated as in FIG. 3 in the constant output state. FIG. 3 is an approximation block diagram of the current control system in the constant output state. In the block diagram shown in FIG. 3, the d-axis voltage command $v_d^{**}$ can be represented by Formula (3).

$$v_d^{**} = (i_d^* - i_{d\_fb}) \cdot K_{p\_ACRd} - \left\{(i_q^* - i_{q\_fb}) \cdot \frac{K_{i\_ACRq}}{s} - R i_{q\_fb}\right\} \cdot G(s) \quad (3)$$

In Formula (3), $K_{p\_ACRd}$ denotes a proportional gain of the d-axis current control section 27a, and $K_{i\_ACRq}$ denotes an integral gain of the q-axis current control section 27b.

When $i_d^* \approx i_{d\_fb}$, Formula (3) can be represented by Formula (4). The d-axis current $i_{d\_fb}$ can be represented by Formula (5), and the q-axis current $i_{q\_fb}$ can be represented by Formula (6).

$$v_d^{**} = -i_{d\_fb} \cdot K_{p\_ACRd} - \left\{(i_q^* - i_{q\_fb}) \cdot \frac{K_{i\_ACRq}}{s} - R i_{q\_fb}\right\} \cdot G(s) \quad (4)$$

$$i_{d\_fb} = \frac{1}{sL_d + R} v_d^{**} \quad (5)$$

$$i_{q\_fb} = \{v_q^{**} - \omega(\phi + L_d \cdot i_{d\_fb})\} \times \frac{1}{sL_q + R} \quad (6)$$

From Formulae (4) and (5), Formula (7) is derived, and further, from Formula (7), Formula (8) is derived.

$$(sL_d + R)i_{d\_fb} = -i_{d\_fb} \cdot K_{p\_ACRd} - \left\{(i_q^* - i_{q\_fb}) \cdot \frac{K_{i\_ACRq}}{s} - R i_{q\_fb}\right\} \cdot G(s) \quad (7)$$

$$(sL_d + R + K_{p\_ACRd})i_{d\_fb} = -\left\{(i_q^* - i_{q\_fb}) \cdot \frac{K_{i\_ACRq}}{s} - R i_{q\_fb}\right\} \cdot G(s) \quad (8)$$

In the constant output state, the q-axis voltage command $v_q^{}$ is saturated and thus is at a fixed value (hereinafter referred to as saturation limit value). Then, by making the saturation limit value of the q-axis voltage command $v_q^{}$ into $\omega\phi$, Formula (6) can be simplified into Formula (9).

$$i_{q\_fb} = -\omega L_d \cdot i_{d\_fb} \times \frac{1}{sL_q + R} \quad (9)$$

From Formula (9), Formula (10) is derived.

$$i_{d\_fb} = -\frac{sL_q + R}{\omega L_d} \cdot i_{q\_fb} \quad (10)$$

Formula (10) is substituted into Formula (8), and thus Formula (11) is derived. Further, from Formula (11), Formula (12) is derived.

$$-(sL_d + R + K_{p\_ACRd})\frac{sL_q + R}{\omega L_d} i_{q\_fb} = \\ -\left\{(i_q^* - i_{q\_fb}) \cdot \frac{K_{i\_ACRq}}{s} - R i_{q\_fb}\right\} \cdot G(s) \quad (11)$$

$$\frac{K_{i\_ACRq}}{s} \cdot G(s) \cdot i_q^* = \\ -\left\{\frac{K_{i\_ACRq}}{s} \cdot G(s) + R \cdot G(s) + \frac{(sL_d + R + K_{p\_ACRd})(sL_q + R)}{\omega L_d}\right\} i_{q\_fb} \quad (12)$$

Thus, a transfer function $G_T(s)$ from the q-axis current command $i_q^*$ to the q-axis current $i_{q\_fb}$ in the constant output state can be represented by Formula (13).

$$G_T(s) = \frac{i_{q\_fb}}{i_q^*} \quad (13)$$

$$= \frac{\frac{K_{i\_ACRq}}{s} \cdot G(s)}{\frac{K_{i\_ACRq}}{s} \cdot G(s) + R \cdot G(s) + \frac{(sL_d + R + K_{p\_ACRd})(sL_q + R)}{\omega L_d}}$$

$$= \frac{K_{i\_ACRq} \cdot G(s)}{K_{i\_ACRq} \cdot G(s) + sR \cdot G(s) + \frac{s}{\omega L_d}\left\{\begin{array}{l} s^2 L_d L_q + s(RL_d + RL_q + K_{p\_ACRd} \cdot L_q) + \\ (R^2 + R \cdot K_{p\_ACRd}) \end{array}\right\}}$$

$$= \frac{K_{i\_ACRq} \cdot G(s)}{s^3 \frac{L_q}{\omega} + s^2 \frac{1}{\omega}\left(R + R\frac{L_q}{L_d} + K_{p\_ACRd} \cdot \frac{L_q}{L_d}\right) + s\frac{1}{\omega}\left(\frac{R^2}{L_d} + \frac{R \cdot K_{p\_ACRd}}{L_d}\right) + sR \cdot G(s) + K_{i\_ACRd} \cdot G(s)}$$

$$= \frac{\frac{\omega}{L_q} K_{i\_ACRq} \cdot G(s)}{s^3 + s^2\left(\frac{R}{L_q} + \frac{R}{L_d} + \frac{K_{p\_ACRd}}{L_d}\right) + s\left(\frac{R^2}{L_d L_q} + \frac{R \cdot K_{p\_ACRd}}{L_d L_q}\right) + s\frac{\omega R}{L_q} \cdot G(s) + \frac{\omega}{L_q} K_{i\_ACRd} \cdot G(s)}$$

Here, when a current control gain is set as represented by Formula (14) with a current control response $\omega_{ACR}$ [rad/s] as a parameter, the transfer function $G_T(s)$ represented by Formula (13) can be represented by Formula (15).

$$K_{p\_ACRd} = L_d \times \omega_{ACR} \quad (14)$$
$$K_{i\_ACRd} = R \times \omega_{ACR}$$
$$K_{p\_ACRq} = L_q \times \omega_{ACR}$$
$$K_{i\_ACRq} = R \times \omega_{ACR}$$

$$G_T(s) = \frac{i_{q\_fb}}{i_q^*} = \frac{\frac{R}{L_q}\omega_{ACR} \cdot \omega G(s)}{s^3 + s^2\left(\frac{R}{L_q} + \frac{R}{L_d} + \omega_{ACR}\right) + s\left(\frac{R^2}{L_d L_q} + \frac{R}{L_q}\omega_{ACR}\right) + s\frac{\omega R}{L_q} \cdot G(s) + \frac{R}{L_q}\omega_{ACR} \cdot \omega G(s)} \quad (15)$$

The transfer function $G_T(s)$ represented by Formula (15) contains the electrical angular velocity $\omega$ of the motor 3, and thus the torque response is velocity dependent. In view of this, in the motor controller 1 according to this embodiment, a constant output control gain G(s) in the constant output control section 34 is set to be inversely proportional to the electrical angular velocity $\omega$. This eliminates the velocity dependency of the torque response. The electrical angular velocity $\omega$ is in proportional relationship with the electrical-angle rotational frequency of the motor 3 and with the output frequency of the voltage command (because when the motor 3 is a synchronous motor, the electrical-angle rotational frequency of the motor 3 matches the output frequency of the motor controller). Hence, setting the constant output control gain G(s) to be inversely proportional to the electrical-angle rotational frequency of the motor 3 and to the output frequency of the voltage command eliminates the velocity dependency of the torque response. As used herein, the output frequency of the voltage command refers to the frequency of the output voltage specified by the output voltage command.

When the control by the constant output control section 34 is P control (proportional control), as the voltage saturation develops, a steady-state deviation occurs in the integral value $\Sigma ACR_q$ of the q-axis current control, resulting in degraded accuracy of the q-axis current control. In view of this, as the method of control by the constant output control section 34, such a control method is employed that I control (integral control) is added to P control.

When the control by the constant output control section 34 is PI control, the characteristic equation becomes one order higher into a fourth-order characteristic equation, which makes the designing complicated in PI control. In view of this, to facilitate the designing, the control by the constant output control section 34 may be PID control.

When the control by the constant output control section 34 is PID control, the constant output control gain G(s) of the constant output control section 34 can be represented by Formula (16). In Formula (16), $K_{p\_CPC}$ denotes a proportional gain of the constant output control, $K_{d\_CPC}$ denotes a differentiate gain of the constant output control, and $K_{i\_CPC}$ denotes an integral gain of the constant output control.

$$G(s) = \frac{1}{\omega}\left(sK_{d\_CPC} + K_{p\_CPC} + \frac{K_{i\_CPC}}{s}\right) \quad (16)$$

From Formula (16), Formula (15) can be represented by Formula (17).

$$G_T(s) = \frac{i_{q\_fb}}{i_q^*} = \frac{\frac{R}{L_q}\omega_{ACR} \cdot \left(sK_{d\_CPC} + K_{p\_CPC} + \frac{K_{i\_CPC}}{s}\right)}{s^3 + s^2 A + sB + C + \frac{D}{s}} \quad (17)$$

$$A = \frac{R}{L_q} + \frac{R}{L_d} + \omega_{ACR} + \frac{R}{L_q}K_{d\_CPC}$$

$$B = \frac{R}{L_q}\left(\omega_{ACR} + \frac{R}{L_d} + K_{p\_CPC} + \omega_{ACR}K_{d\_CPC}\right)$$

$$C = \frac{R}{L_q}(\omega_{ACR}K_{p\_CPC} + K_{i\_CPC})$$

$$D = \frac{R}{L_q}\omega_{ACR}K_{i\_CPC}$$

Thus, the motor controller 1 according to this embodiment includes the constant output control section 34, which outputs a correction voltage command relative to the d-axis voltage command $v_d^{**'}$ based on the output of the q-axis integral control section 52 of the q-axis current control section 27b. Then, the motor controller 1 subtracts the correction voltage command $\Delta v_d^*$ from the d-axis voltage command $v_d^{'}$, thereby obtaining the d-axis voltage command $v_d^{}$.

Specifically, the motor controller 1 controls the d-axis voltage command $v_d^{**}$ based on the output of the q-axis integral control section 52, thereby performing constant output control of the q-axis current $i_{q\_fb}$. This inhibits both degradation of torque responsivity and degradation of the voltage utilization ratio in the constant output region of the motor 3. Additionally, there is no need to switch the control method in the region of the constant output control, which prevents the control from developing into complication.

Figure 4:
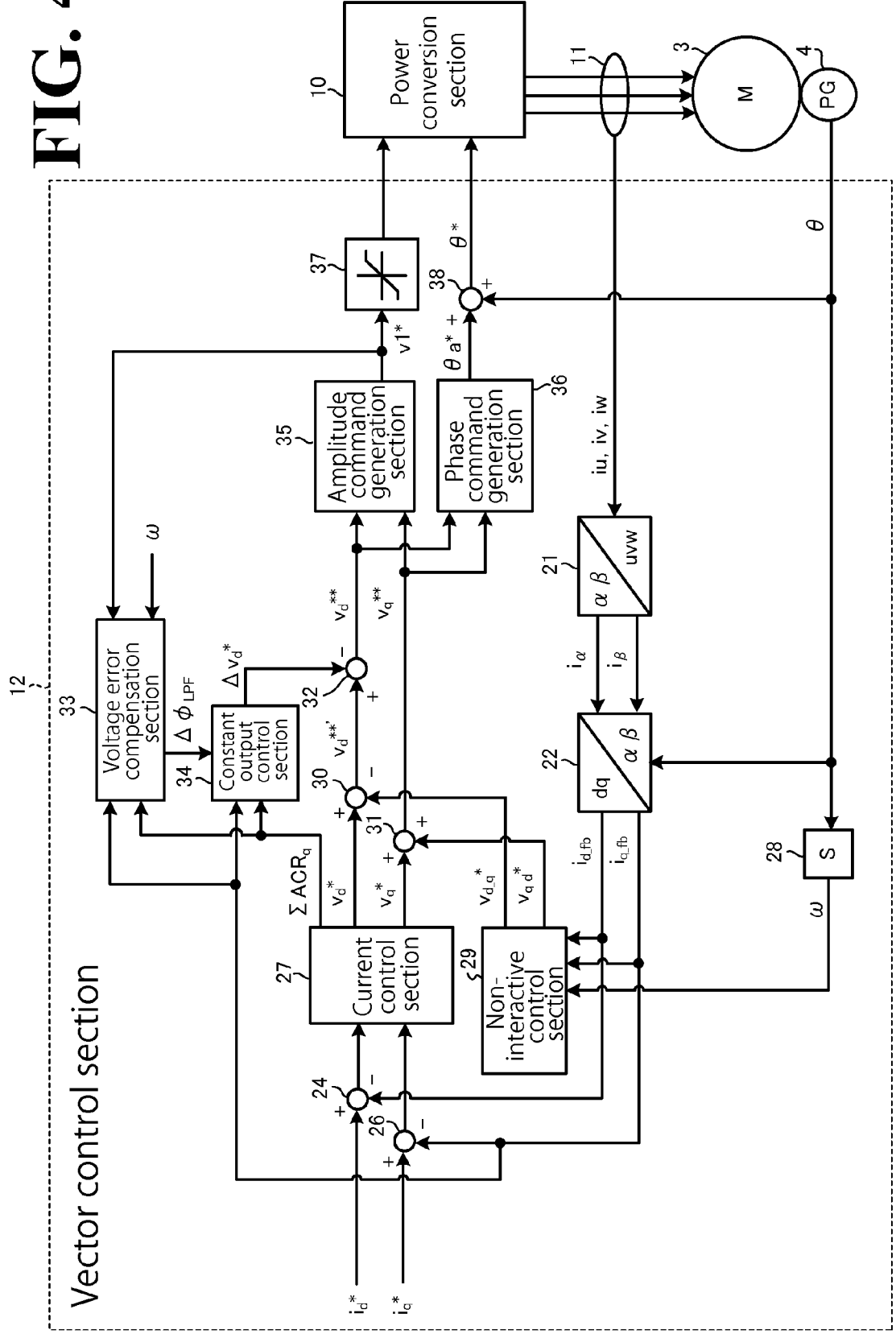
FIG. 4 illustrates an exemplary detailed configuration of the vector control section shown in FIG. 1.

An exemplary detailed configuration of the motor controller 1 according to this embodiment will be described in detail below by referring to FIGS. 4 to 7. FIG. 4 illustrates an exemplary detailed configuration of the vector control section 12 according to this embodiment.

As shown in FIG. 4, the vector control section 12 includes a three-phase/two-phase conversion section 21, a d-q coordinate conversion section 22, the subtraction sections 24, 26, 30, and 32, a current control section 27, a velocity arithmetic section 28, the non-interactive control section 29, addition sections 31 and 38, the voltage error compensation section 33, the constant output control section 34, an amplitude command generation section 35, a phase command generation section 36, and a limiter 37.

The three-phase/two-phase conversion section 21 converts each of the output currents iu, iv, and iw into αβ components of two orthogonal axes on a fixed coordinate system, and obtains a fixed coordinate current vector on a αβ-axes coordinate system, which has, as vector components, an output current $i_\alpha$ in the α axis direction and an output current $i_\beta$ in the β axis direction.

Based on the rotor electrical angle phase θ, which is detected by the position detection section 4 and indicates the rotor position of the motor 3, the d-q coordinate conversion section 22 converts the components on the αβ-axes coordinate system output from the three-phase/two-phase conversion section 21 into components on a d-q axis coordinate system. In this manner, the d-q coordinate conversion section 22 obtains the d-axis current $i_{d\_fb}$ and the q-axis current $i_{q\_fb}$.

The subtraction section 24 subtracts the d-axis current $i_{d\_fb}$ from the d-axis current command $i_d^*$, thereby generating the d-axis current deviation, and outputs the d-axis current deviation to the current control section 27. The d-axis current command $i_d^*$ is a target current value of the flux-axis current. When, for example, no reluctance torque is used, the d-axis current command $i_d^*$ is set at zero.

The subtraction section 26 subtracts the q-axis current $i_{q\_fb}$ from the q-axis current command $i_q^*$, thereby generating the q-axis current deviation, and outputs the q-axis current deviation to the current control section 27. The q-axis current command $i_q^*$ is a target current value of the torque-axis current and generated based on, for example, a torque command.

The current control section 27 performs PI control of the d-axis current deviation, thereby generating the d-axis voltage command $v_d^*$, and outputs the d-axis voltage command $v_d^*$ to the subtraction section 30. Also the current control section 27 performs PI control of the q-axis current deviation, thereby generating the q-axis voltage command $v_q^*$, and outputs the q-axis voltage command $v_q^*$ to the addition section 31. Further, the current control section 27 outputs the integral value $\Sigma ACR_q$ of the q-axis current deviation to the voltage error compensation section 33 and the constant output control section 34.

Figure 5:
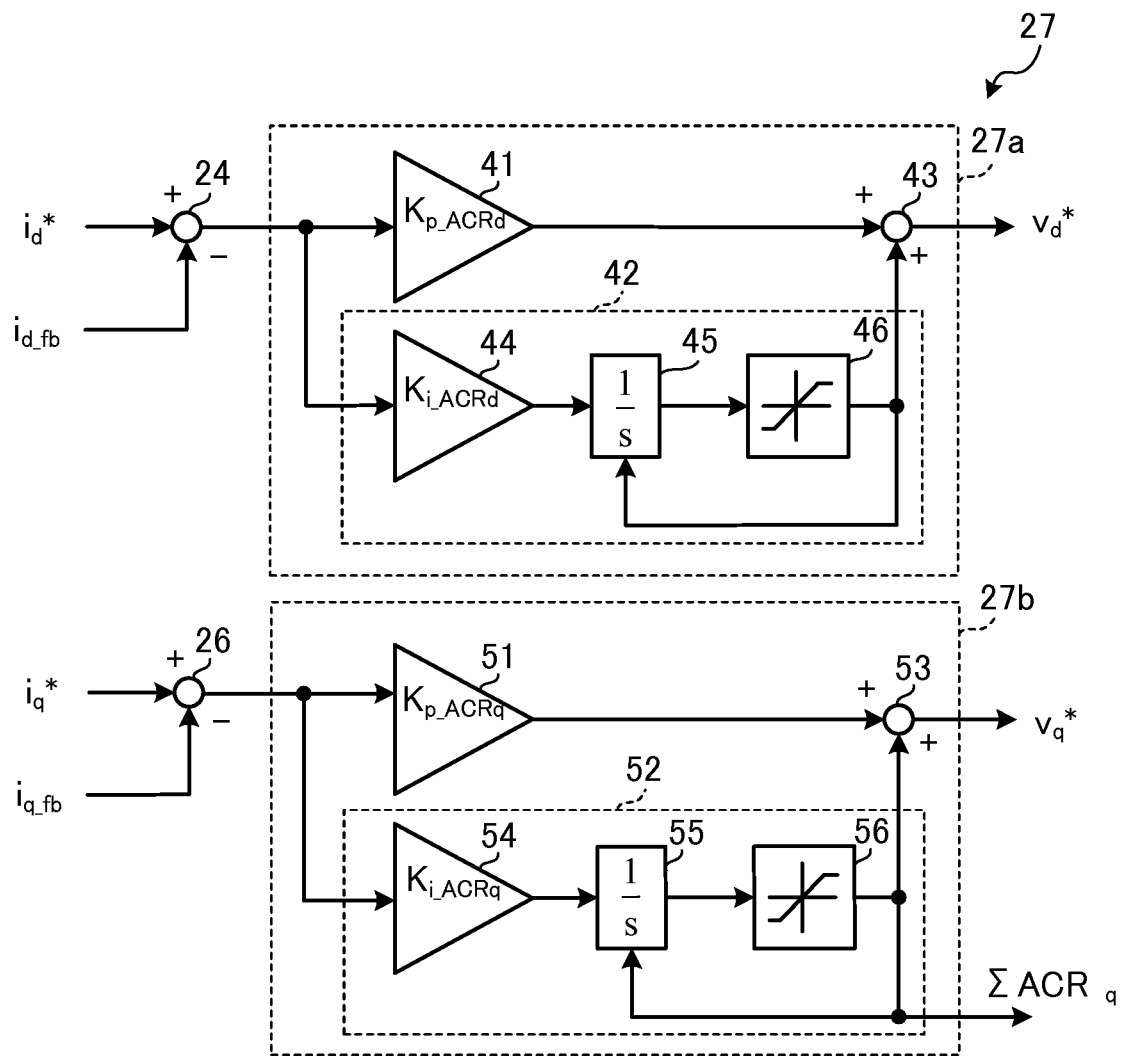
FIG. 5 illustrates an exemplary detailed configuration of a current control section shown in FIG. 4.

FIG. 5 illustrates an exemplary detailed configuration of the current control section 27. As shown in FIG. 5, the current control section 27 includes the d-axis current control section 27a and the q-axis current control section 27b. The d-axis current control section 27a includes a d-axis proportional control section 41, the d-axis integral control section 42, and a d-axis voltage command section 43.

The d-axis proportional control section 41 performs proportional control at a proportional gain $K_{p\_ACRd}$. The d-axis integral control section 42 includes a coefficient multiplication section 44, an integral section 45, and a limiter 46, and performs integral control at an integral gain $K_{i\_ACRd}$. The limiter 46 is a limiter dedicated to the integral item of the d-axis current control, and has an upper limit and a lower limit.

When the integral value of the integral section 45 exceeds the upper limit or falls below the lower limit, the limiter 46 limits the output of the integral value of the integral section 45 to the upper limit or the lower limit.

The d-axis current $i_{d\_fb}$ at the time when the q-axis voltage command $v_q^{}$ becomes saturated flows while being dependent on the d-axis voltage command $v_d^{}$. Specifically, the d-axis current $i_{d\_fb}$ is controlled by the constant output control section 34 so as to allow the q-axis current $i_{q\_fb}$ to flow in accordance with the command value. This control collides with the control of the d-axis current $i_{d\_fb}$ by the d-axis current control section 27a. Thus, when the q-axis voltage command $v_q^{**}$ becomes saturated, it is necessary to inhibit the control operation by the d-axis current control section 27a, which is why the limiter 46 is provided.

The d-axis voltage command section 43 adds the output of the d-axis integral control section 42 to the output of the d-axis proportional control section 41, thereby generating the d-axis voltage command $v_d^*$.

The q-axis current control section 27b includes a q-axis proportional control section 51, the q-axis integral control section 52, and a q-axis voltage command section 53. The q-axis proportional control section 51 performs proportional control at a proportional gain $K_{p\_ACRq}$. The q-axis integral control section 52 includes a coefficient multiplication 54, an integral section 55, and a limiter 56, and performs integral control at an integral gain $K_{i\_ACRq}$. When the integral value $\Sigma ACR_q$ of the integral section 55 reaches the upper limit or the lower limit set in advance, the limiter 56 limits the output of the integral value $\Sigma ACR_q$ of the integral section 55 to the upper limit or the lower limit.

The q-axis voltage command section 53 adds the output of the q-axis integral control section 52 to the output of the q-axis proportional control section 51, thereby generating the q-axis voltage command $v_q^*$. Also the output of the q-axis integral control section 52, which is the integral value $\Sigma ACR_q$, is output to the voltage error compensation section 33 and the constant output control section 34.

Referring back to FIG. 4, the vector control section 12 will be further described. As shown in FIG. 4, the velocity arithmetic section 28 differentiates the rotor electrical angle phase θ of the motor 3, thereby obtaining the electrical angular velocity ω of the motor 3, and outputs the electrical angular velocity ω to the non-interactive control section 29.

The non-interactive control section 29 generates the d-axis voltage compensation value $v_{d\_d}^*$ and the q-axis voltage compensation value $v_{q\_d}^*$ based on the q-axis current $i_{q\_fb}$ and the d-axis current $i_{d\_fb}$ output from the d-q coordinate conversion section 22 and based on the electrical angular velocity ω of the motor 3, and outputs the d-axis voltage compensation value $v_{d\_q}^*$ and the q-axis voltage compensation value $v_{q\_d}^*$. The electrical angular velocity ω is in proportional relationship with the electrical-angle rotational frequency of the motor 3 and with the output frequency of the motor controller 1. Hence, the non-interactive control section 29 may also generate the d-axis voltage compensation value $v_{d\_q}^*$ and the q-axis voltage compensation value $v_{q\_d}^*$ based on the electrical-angle rotational frequency of the motor 3 or the output frequency of the motor controller 1 instead of the electrical angular velocity ω, and output the d-axis voltage compensation value $v_{d\_q}^*$ and the q-axis voltage compensation value $v_{q\_d}^*$.

Figure 6:
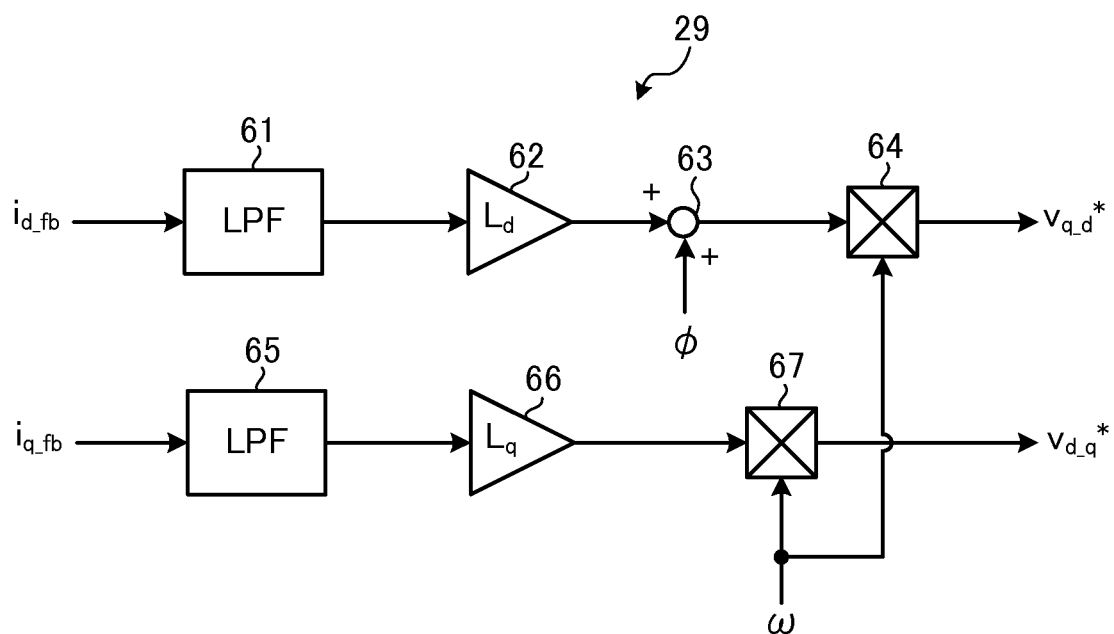
FIG. 6 illustrates an exemplary detailed configuration of a non-interactive control section shown in FIG. 4.

FIG. 6 illustrates an exemplary detailed configuration of the non-interactive control section 29. As shown in FIG. 6, the non-interactive control section 29 includes lowpass filters (LPF) 61 and 65, coefficient multiplication sections 62 and 66, an addition section 63, and multiplication sections 64 and 67.

The LPF 61 removes a high-frequency component of the d-axis current $i_{d\_fb}$ and outputs the resulting d-axis current $i_{d\_fb}$ to the coefficient multiplication section 62. The coefficient multiplication section 62 multiplies the output of the LPF 61 by a d-axis inductance $L_d$, and outputs the product to the addition section 63. The addition section 63 adds an induced voltage constant $\phi$ to the output of the coefficient multiplication section 62, and outputs the sum to the multiplication section 64. The multiplication section 64 multiplies the output of the addition section 63 by an electrical angular velocity co, thereby generating the q-axis voltage compensation value $v_{q\_d}*$ represented by Formula (18).

$$v_{q\_d}* = \omega(L_d i_{d\_fb} + \phi) \quad (18)$$

The LPF 65 removes a high-frequency component of the q-axis current $i_{q\_fb}$, and outputs the resulting q-axis current $i_{q\_fb}$ to the coefficient multiplication section 66. The coefficient multiplication section 66 multiplies the output of the LPF 65 by a q-axis inductance $L_q$, and outputs the product to the multiplication section 67. The multiplication section 67 multiplies the output of the coefficient multiplication section 66 by the electrical angular velocity $\omega$, thereby generating the d-axis voltage compensation value $v_{d\_q}*$ represented by Formula (19).

$$v_{d\_q}* = \omega L q \cdot i_{q\_fb} \quad (19)$$

As described above, the d-axis current $i_{d\_fb}$ flows while being dependent on the d-axis voltage command $v_d**$ corrected by the constant output control section 34, and therefore, does not flow in accordance with the d-axis current command $i_d*$. This causes a substantial error to exist relative to the d-axis current command $i_d*$. Thus, generating the q-axis voltage compensation value $v_{q\_d}*$ based on the command value, namely, the d-axis current command $i_d*$, presumably degrades the accuracy of the non-interactive control.

In view of this, the non-interactive control section 29 generates the q-axis voltage compensation value $v_{q\_d}*$ and the d-axis voltage compensation value $v_{d\_q}*$ respectively based on detected values detected by the current detection section 11, namely, the d-axis current $i_{d\_fb}$ and the q-axis current $i_{q\_fb}$. This ensures accurate non-interactive control.

Referring back to FIG. 4, the vector control section 12 will be further described. As shown in FIG. 4, the subtraction section 30 subtracts the d-axis voltage compensation value $v_{d\_q}*$ from the d-axis voltage command $v_d*$, thereby generating the d-axis voltage command $v_d'$, and outputs the generated d-axis voltage command $v_d'$ to the subtraction section 32. The addition section 31 adds the q-axis voltage compensation value $v_{q\_d}*$ to the q-axis voltage command $v_q*$, thereby generating the q-axis voltage command $v_q$, and outputs the generated q-axis voltage command $v_q$ to the amplitude command generation section 35 and the phase command generation section 36.

The voltage error compensation section 33 identifies the components contained in the integral value $\Sigma ACR_q$ of the q-axis current control as the voltage error $\Delta v$, excluding the component equivalent to the voltage drop due to the coil resistance R. A dominating factor of the voltage error $\Delta v$ is an induced voltage constant error $\Delta$, which is dependent on the rotational velocity of the motor 3. In view of this, the voltage error compensation section 33 obtains the induced voltage constant error $\Delta\phi$ based on the voltage error $\Delta v$.

The voltage error compensation section 33 determines whether a voltage saturation has occurred, and only in the state of no voltage saturation, executes voltage error compensation processing. Whether a voltage saturation has occurred is determined based on Formula (20). Specifically, the voltage error compensation section 33 executes the voltage error compensation processing when $K_h$ is less than $v_{1\_onlineR}$. It is noted that v1* denotes the amplitude (the output of the amplitude command generation section 35) of the output voltage command, described later, and $V_{dc}$ denotes a DC voltage (hereinafter occasionally referred to as DC bus line voltage) output from the DC power source 2. Additionally, $v_{1\_onlineR}$ denotes a setting parameter. $v_{1\_onlineR}$ is set to avoid the voltage saturation including the transient state.

$$K_h = \frac{v1*}{V_{dc}/2} < v1_{\_onlineR} \quad (20)$$

Based on the q-axis current $i_{q\_fb}$, on the integral value $\Sigma ACR_q$ of the q-axis current deviation, and on the electrical angular velocity $\omega$ of the motor 3, the voltage error compensation section 33 performs an arithmetic operation to obtain the induced voltage constant error $\Delta\phi_{LPF}$, and outputs the induced voltage constant error $\Delta\phi_{LPF}$ to the constant output control section 34.

Figure 7:
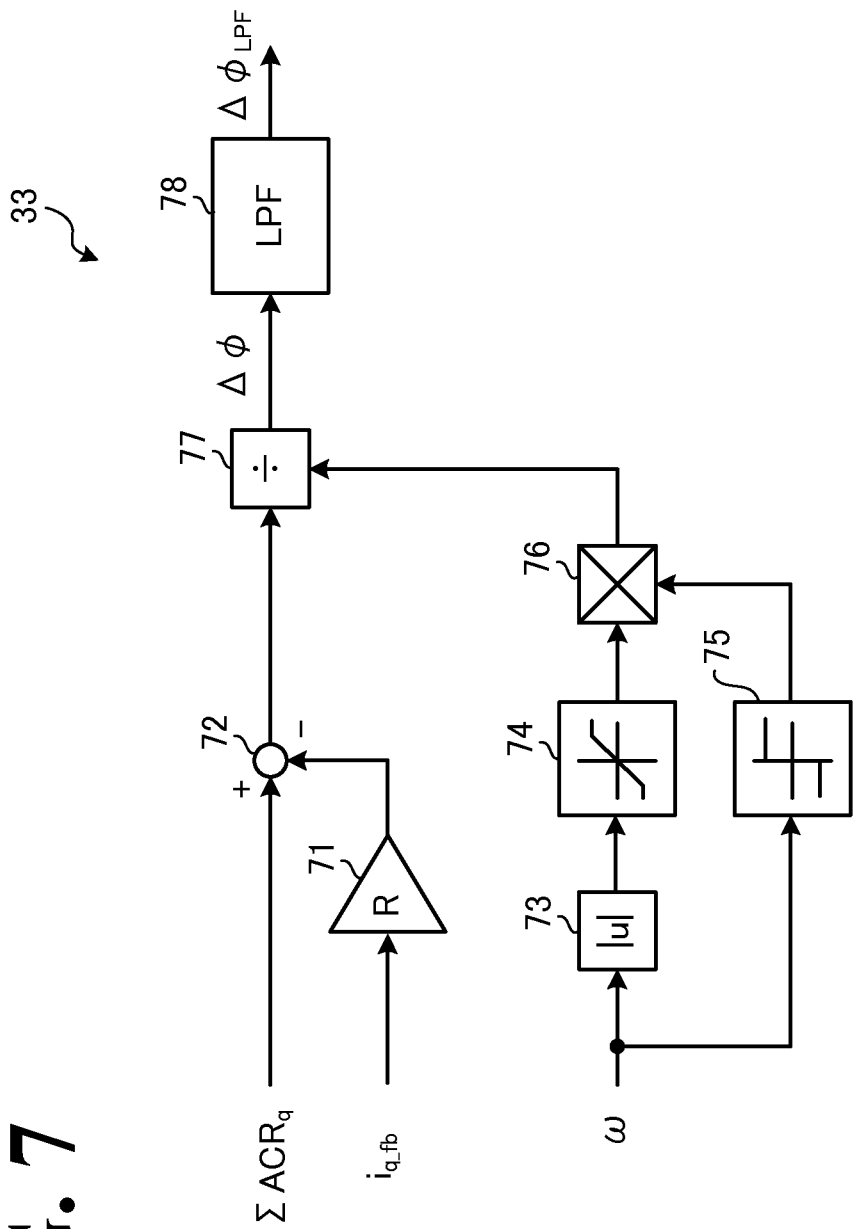
FIG. 7 illustrates an exemplary detailed configuration of a voltage error compensation section shown in FIG. 4.

FIG. 7 illustrates an exemplary detailed configuration of the voltage error compensation section 33. As shown in FIG. 7, the voltage error compensation section 33 includes a coefficient multiplication section 71, the subtraction section 72, an absolute value arithmetic section 73, a limiter 74, a sign function arithmetic section 75, which outputs the positive-negative sign of the electrical angular velocity $\omega$ of the motor 3, a multiplication section 76, a division section 77, and a lowpass filter (LPF) 78.

The coefficient multiplication section 71 multiplies the coil resistance R by the q-axis current $i_{q\_fb}$, and outputs the product to the subtraction section 72. The subtraction section 72 subtracts the output of the coefficient multiplication section 71 from the integral value $\Sigma ACR_q$ of the q-axis current deviation.

The absolute value arithmetic section 73 performs an arithmetic operation to obtain the absolute value of the electrical angular velocity $\omega$ of the motor 3, and outputs the absolute value to the limiter 74. When the absolute value of the electrical angular velocity co reaches a limit value set in advance, the limiter 74 limits the absolute value of the electrical angular velocity $\omega$ to the limit value. For example, the limiter 74 limits the lower limit of the absolute value of the electrical angular velocity $\omega$ to 10 Hz×2$\pi$, and limits the upper limit of the absolute value of the electrical angular velocity $\omega$ to 100 Hz×2$\pi$. The sign function arithmetic section 75 performs an arithmetic operation to obtain the positivity or negativity of the electrical angular velocity $\omega$ of the motor 3, and outputs the arithmetic result to the multiplication section 76. The multiplication section 76 multiplies the output of the limiter 74 and the output of the sign function arithmetic section 75, and outputs the product to the division section 77. An example of the sign function processing is to output "+1" when the input is a positive, and to output "−1" when the input is a negative value.

The division section 77 divides the output of the subtraction section 72 by the output of the multiplication section 76, thereby obtaining the induced voltage constant error $\Delta\phi$. A dominating factor of the voltage error $\Delta v$ is the induced voltage constant error $\Delta\phi$. Another voltage error factor is the voltage component, which is dependent on current differentiation. The voltage component is not easy to identify and is negligible in stationary state. In view of this, the voltage component is set to be removed by the LPF 78.

Specifically, the LPF 78 removes a high-harmonic component of the induced voltage constant error $\Delta\phi$ output from the division section 77, thereby generating the induced voltage constant error $\Delta\phi_{LPF}$, and outputs the induced voltage constant error $\Delta\phi_{LPF}$. An example of the LPF 78 is a primary-delay filter with a cutoff frequency adjustable as a setting parameter.

Referring back to FIG. 4, the vector control section 12 will be further described. As shown in FIG. 4, the constant output control section 34 generates the correction voltage command $\Delta v_d^*$ based on the q-axis current $i_{q\_fb}$, on the integral value $\Sigma ACR_q$ of the q-axis current deviation, and on the induced voltage constant error $\Delta\phi_{LPF}$, and outputs the correction voltage command $\Delta v_d^*$ to the subtraction section 32. When the non-interactive control section 29 removes an interference component from the q-axis voltage command $v_q^*$, it is common practice to set the proportional gain $K_{p\_ACRq}$ to a low level. When the proportional gain $K_{p\_ACRq}$ of the q-axis proportional control section 51 is not set to a high level, most of the output of the q-axis current control section 27b results in the integral value $\Sigma ACR_q$. In view of this, it is possible to input into the constant output control section 34 the output of the q-axis current control section 27b instead of the integral value $\Sigma ACR_q$.

Figure 8:
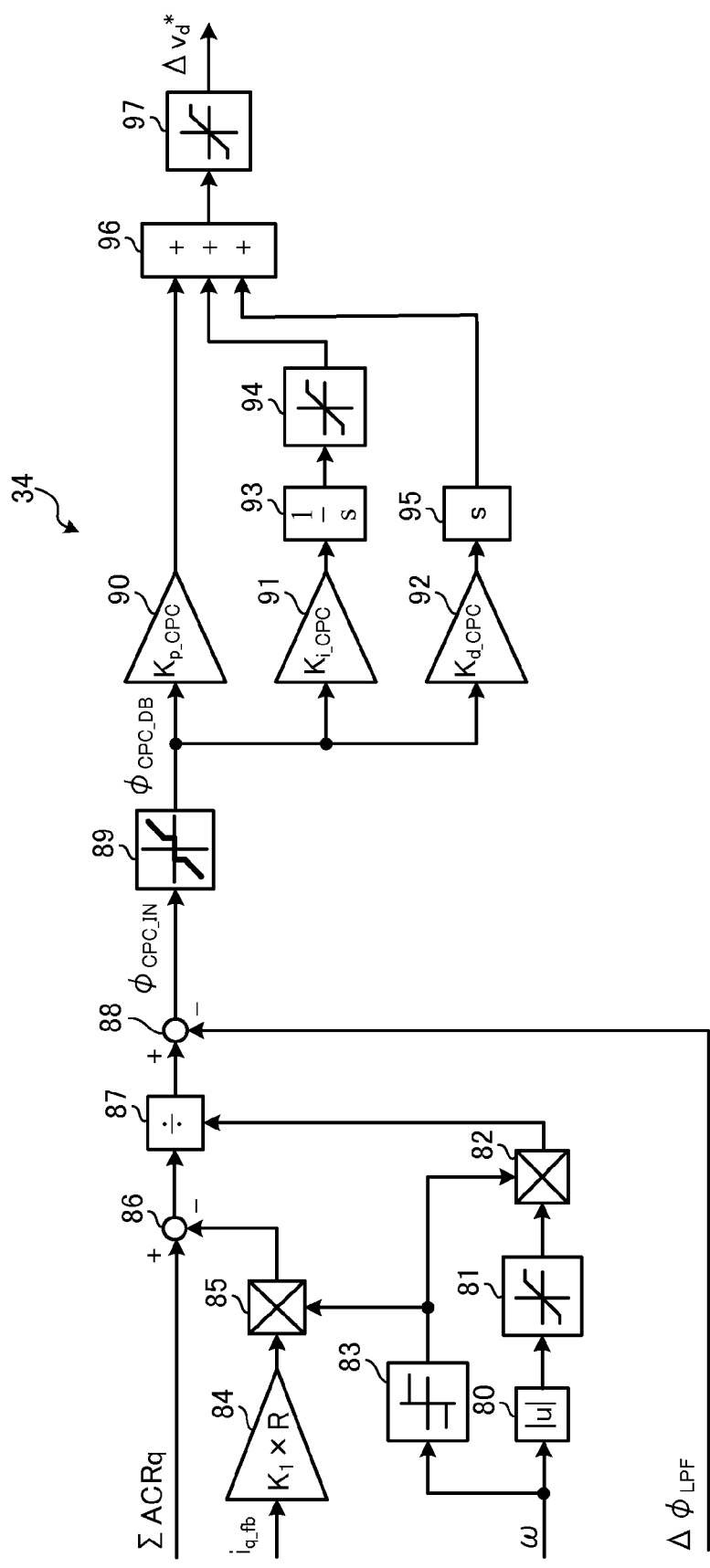
FIG. 8 illustrates an exemplary detailed configuration of a constant output control section shown in FIG. 4.

FIG. 8 illustrates an exemplary detailed configuration of the constant output control section 34. As shown in FIG. 8, the constant output control section 34 includes an absolute value arithmetic section 80, a limiter 81, multiplication sections 82 and 85, a sign function arithmetic section 83, a coefficient multiplication section 84, the subtraction sections 86 and 88, and a division section 87.

The absolute value arithmetic section 80 performs an arithmetic operation to obtain the absolute value of the electrical angular velocity ω of the motor 3, and outputs the absolute value to the limiter 81. When the absolute value of the electrical angular velocity ω reaches a limit value set in advance, the limiter 81 limits the absolute value of the electrical angular velocity ω to the limit value. For example, the limiter 81 limits the lower limit of the absolute value of the electrical angular velocity ω to 10 Hz×2π, and limits the upper limit of the absolute value of the electrical angular velocity ω to 100 Hz×2π. This inhibits occurrences at the time when the motor 3 is at a super-low velocity, such as the division section 77 dividing by zero and the output of the division section 77 becoming excessive.

The sign function arithmetic section 83 performs sign function processing of the electrical angular velocity ω of the motor 3, and outputs the arithmetic result to the multiplication sections 82 and 85. The multiplication section 82 multiplies the output of the limiter 81 and the output of the sign function arithmetic section 83, and outputs the product to the division section 87.

The coefficient multiplication section 84 multiplies the q-axis current $i_{q\_fb}$ by a coefficient $K_1 \times R$, and outputs the product to the multiplication section 85. The multiplication section 85 multiplies the output of the coefficient multiplication section 84 by the output of the sign function arithmetic section 83, and outputs the product to the subtraction section 86. The subtraction section 86 subtracts the output of the multiplication section 85 from the integral value $\Sigma ACR_q$ of the q-axis current deviation, and outputs the subtraction result to the division section 87.

The division section 87 divides the output of the subtraction section 86 by the output of the multiplication section 82, and outputs the division result to the subtraction section 88. The subtraction section 88 subtracts the induced voltage constant error $\Delta\phi_{LPF}$ from the output of the division section 87, and outputs the subtraction result as an adjustment value $\phi_{CPC\_IN}$ to a dead zone arithmetic section 89. It is only in the state of no voltage saturation that the voltage error compensation section 33 performs an arithmetic operation to obtain the induced voltage constant error $\Delta\phi_{LPF}$; the voltage error compensation section 33 performs no arithmetic operations in the state of voltage saturation. Thus, the induced voltage constant error $\Delta\phi_{LPF}$ input into the subtraction section 88 in the state of voltage saturation does not contain an amount equivalent to the voltage saturation ($\Delta V_{st}$ in Formula (21)). In the processing by the subtraction section 88, only the amount equivalent to the induced voltage constant error $\Delta\phi_{LPF}$ is removed from the output of the subtraction section 88. As a result, a value equivalent to the voltage saturation $\Delta V_{st}$ is extracted as the adjustment value $\phi_{CPC\_IN}$.

The integral value $\Sigma ACR_q$ of the q-axis current deviation in the state of voltage saturation is considered to contain a voltage component represented by Formula (21). In Formula (21), $\Delta L_d$ denotes a parameter error of d-axis inductance.

$$\Sigma ACR_q = Ri_{q\_fb} + \omega(\Delta\phi + \Delta L_d i_{d\_fb}) + \Delta V_{st} \quad (21)$$

In Formula (21), the first item on the right-hand side denotes the amount equivalent to the voltage drop due to resistance, and the second item on the right-hand side denotes the amount equivalent to the parameter error of induced voltage and inductance. Additionally, the third item on the right-hand side ($\Delta V_{st}$) denotes an item representing the voltage saturation.

The second item on the right-hand side is an item dependent on the rotational velocity of the motor 3, and as such, is compensated for by the induced voltage constant error $\Delta\phi_{LPF}$ (which is a value obtained by an arithmetic operation in the state of no voltage saturation) output from the voltage error compensation section 33.

When the input adjustment value $\phi_{CPC\_IN}$ equals or falls short of the dead zone, the dead zone arithmetic section 89 outputs zero as an adjustment value $\phi_{CPC\_DB}$.

Referring back to FIG. 8, the constant output control section 34 will be further described. As shown in FIG. 8, the constant output control section 34 includes a PID control section that includes coefficient multiplication sections 90 to 92, an integral section 93, limiters 94 and 97, a differential section 95, and an addition section 96.

The adjustment value $\phi_{CPC\_DB}$ output from the dead zone arithmetic section 89 is input into the coefficient multiplication sections 90 to 92. The coefficient multiplication section 90 multiplies the adjustment value $\phi_{CPC\_DB}$ by a proportional gain $K_{p\_CPC}$, and outputs the product. The coefficient multiplication section 91 multiplies the adjustment value $\phi_{CPC\_DB}$ by an integral gain $K_{i\_CPC}$, and outputs the product. The coefficient multiplication section 92 multiplies the adjustment value $\phi_{CPC\_DB}$ by a differential gain $K_{d\_CPC}$, and outputs the product.

The output of the coefficient multiplication section 91 is integrated by the integral section 93 and input into the limiter 94. The limiter 94 limits the output of the integral section 93 within a predetermined range, and outputs the limited output to the addition section 96. Specifically, when the output of the integral section 93 reaches an upper limit or a lower limit set in advance, the limiter 94 limits the output of the integral section 93 to the upper limit or the lower limit, and outputs the limited output.

The output of the coefficient multiplication section 92 is differentiated by the differential section 95 and output to the addition section 96. The addition section 96 adds together the output of the coefficient multiplication section 90, the output of the limiter 94, and the output of the differential section 95, and outputs the sum to the limiter 97. The limiter 97 limits the correction voltage command $\Delta v_d^*$ to keep the correction voltage command $\Delta v_d^*$ from exceeding a predetermined range.

Referring back to FIG. 4, the vector control section 12 will be further described. As shown in FIG. 4, the subtraction section 32 subtracts the correction voltage command $\Delta v_d^*$ from the d-axis voltage command $v_d^{\prime}$, thereby generating the d-axis voltage command $v_d^{}$, and outputs the d-axis voltage command $v_d^{**}$ to the amplitude command generation section 35 and the phase command generation section 36.

The amplitude command generation section 35 obtains an amplitude $v1^*$ of the output voltage command based on the q-axis voltage command $v_q^{}$ and the d-axis voltage command $v_d^{}$. For example, the amplitude command generation section 35 obtains the amplitude $v1^*$ of the output voltage command from Formula (22), and outputs the amplitude $v1^*$ to the limiter 37. The limiter 37 limits the amplitude $v1^*$ of the output voltage command within a predetermined range, and outputs the limited amplitude $v1^*$.

$$v1^* = (v_d^{2} + v_q^{2})^{1/2} \quad (22)$$

The phase command generation section 36 obtains an output phase command $\theta a^*$ (phase difference as compared with the d axis) based on the q-axis voltage command $v_q^{}$ and the d-axis voltage command $v_d^{}$. For example, the phase command generation section 36 obtains a phase command $\theta a^*$ of the output voltage from Formula (23), and outputs the phase command $\theta a^*$ to the addition section 38. The addition section 38 adds the rotor electrical angle phase $\theta$ detected by the position detection section 4 to the phase command $\theta a$ of the output voltage, thereby generating an output phase command $\theta^*$, and outputs the output phase command $\theta^*$ to the power conversion section 10.

$$\theta a^* = \tan^{-1}(v_q^{}/v_d^{}) \quad (23)$$

Based on the amplitude $v1^*$ of the output voltage command output from the vector control section 12 and based on the phase command $\theta^*$ of the output voltage, the PWM signal generation section 14 of the power conversion section 10 generates a PWM signal by known PWM control so as to control the three-phase inverter circuit 13.

Thus, the motor controller 1 according to the first embodiment includes the constant output control section 34, which generates the correction voltage command $\Delta v_d^*$ based on the integral value $\Sigma ACR_q$ of the q-axis current deviation output from the q-axis integral control section 52 and which outputs the correction voltage command $\Delta v_d^*$. Then, the motor controller 1 subtracts the correction voltage command $\Delta v_d^*$ from the d-axis voltage command $v_d^{\prime}$, thereby obtaining the d-axis voltage command $v_d^{}$. This inhibits both degradation of torque responsivity and degradation of the voltage utilization ratio in the constant output region of the motor 3.

Second Embodiment

Next, a motor controller according to the second embodiment will be described. The motor controller according to this embodiment is different from the motor controller 1 according to the first embodiment in that the vector control section includes a current limitation section. The elements with corresponding or identical functions to those of the elements of the motor controller 1 according to the first embodiment are assigned identical reference numerals, and these elements will not be elaborated here.

Figure 9:
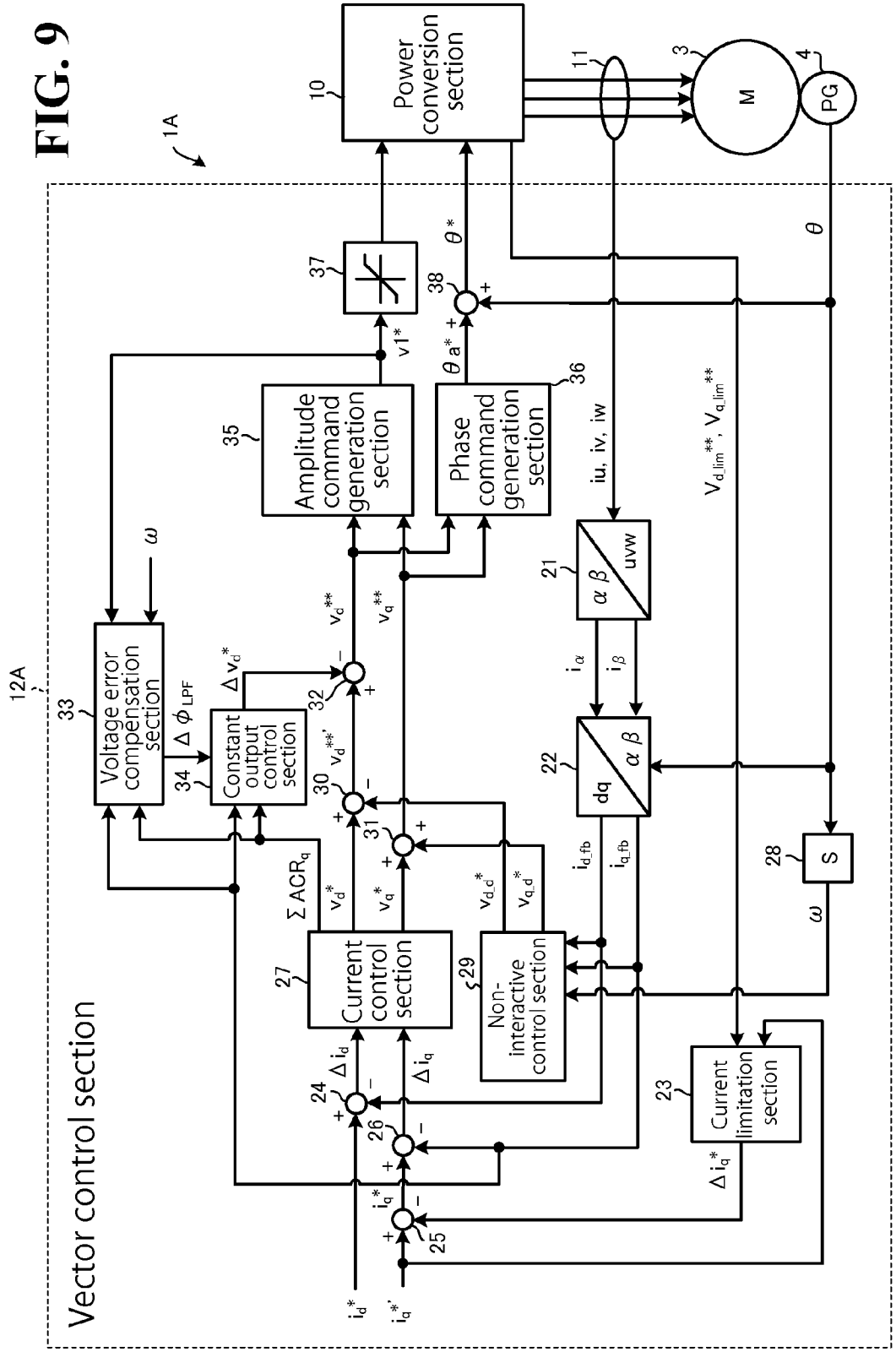
FIG. 9 illustrates an exemplary detailed configuration of a motor controller according to a second embodiment.

FIG. 9 is a diagram illustrating a motor controller according to the second embodiment. As shown in FIG. 9, a motor controller 1A according to the second embodiment includes, at a vector control section 12A, a current limitation section 23 and the subtraction section 25.

As described above, during the constant output control, the control of the q-axis current $i_{q\_fb}$ is more effective than the control of the d-axis current $i_{d\_fb}$. This makes the d-axis current $i_{d\_fb}$ difficult to control into a value corresponding to the d-axis current command $i_d^*$. Thus, if an output current $i_m$ (which indicates the size of the output current) represented by Formula (24) turned into overcurrent state, the inhibition of this state would become less forceful.

$$i_m = \sqrt{i_{d\_fb}^2 + i_{q\_fb}^2} \quad (24)$$

In view of this, the vector control section 12A of the motor controller 1A includes the current limitation section 23 and the subtraction section 25. This configuration controls the output current $i_m$ to turn the driving state toward alleviated voltage saturation. Specifically, when the output current $i_m$ exceeds a current limitation command $i_m^*$, which is a limit value, then the speed command is lowered (for example, the acceleration-deceleration rate of the speed command or the speed command value is lowered in accordance with a current deviation $\Delta i_m^*$ between the current limitation command $i_m^*$ and the output current $i_m$, or the acceleration-deceleration rate of the speed command or the speed command value is lowered in accordance with a q-axis current amend command $\Delta i_q^*$). At the same time, the q-axis current command $i_q^*$ is also lowered. This inhibits overcurrent as early as possible while controlling the driving state toward alleviated voltage saturation. The speed command is a value that is proportional to the output frequency of the voltage command. When the current flowing through the motor 3 exceeds the limit value, the current limitation section 23 lowers, for example, the output frequency of the voltage command or the acceleration-deceleration rate of the output frequency.

Figure 10:
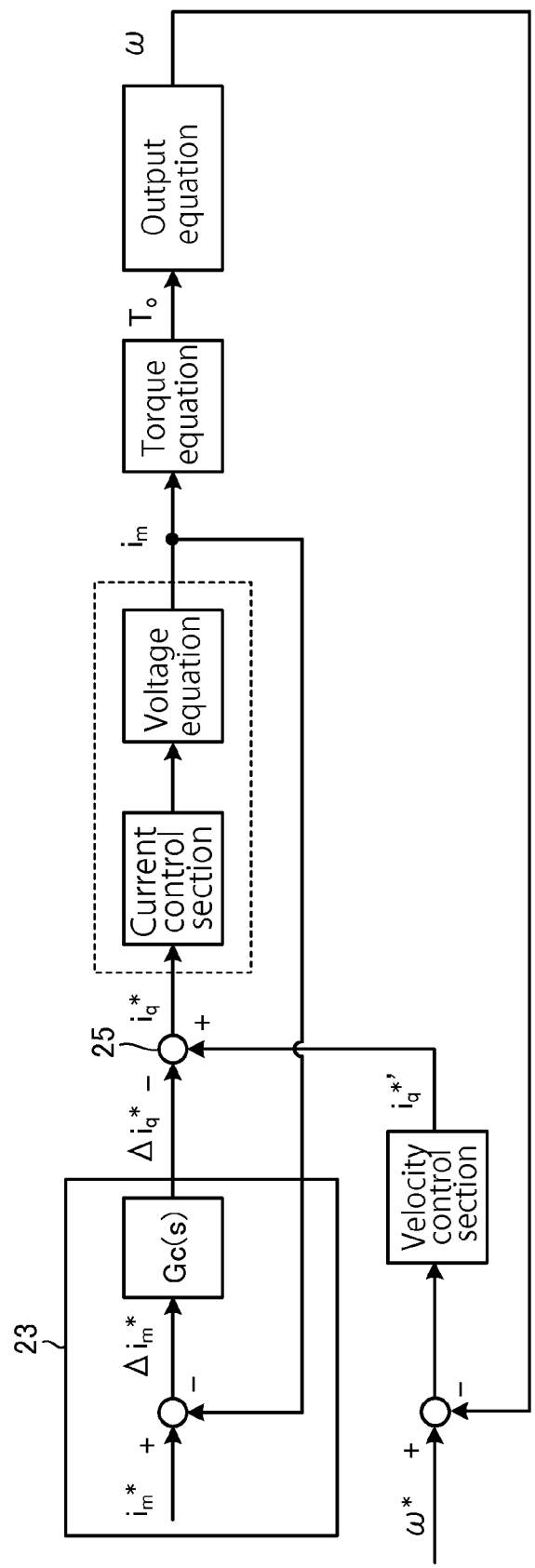
FIG. 10 is a block diagram ranging from a current limitation command to an output current.

In the current limitation section 23, with a transfer function $Gc(s)$ defined between the output current deviation $\Delta i_m^*$ and the q-axis current amend command $\Delta i_q^*$, a block diagram ranging from the current limitation command $i_m^*$ to the output current $i_m$ is established as shown in FIG. 10. Considering that the current control section is sufficiently at high speed relative to the current limiting operation, the current control section will be assumed at constant value 1 in the following description. Also considering that the current limiting operation is sufficiently at high speed relative to a velocity control section, changes in the velocity control section will be disregarded.

The output current deviation $\Delta i_m^*$ is a deviation between the current limitation command $i_m^*$ and the output current $i_m$, and the current limitation command $i_m^*$ is generated dynamically within the current limitation section 23.

Here, the control block diagram shown in FIG. 10 can be represented by Formula (25), where Q denotes reactive power [W], $\theta_\phi$ denotes power factor [rad], I denotes output current $i_m$ [A], and V denotes output voltage [v (volts)]. The torque T in Formula (25) can be represented by Formula (26).

$$Q = V \times I = |V||I| \sin \theta_\phi = |V||I| - \omega \times T \quad (25)$$

$$T = \Delta_{iq}^* \times K_t = \Delta T_{lim}^* \quad (26)$$

Also considering that the driving is in the constant output state, two parameters (V and ω) are set as fixed values as represented by Formula (27), and the transfer function from the torque T to the current |I| can be represented by Formula (28).

$$V = \frac{V_{dc}}{2} \quad (27)$$

$$\omega = const.$$

$$|I| = \frac{\omega}{|V|(1-\sin\theta_\phi)} \times T \quad (28)$$

Hence, ensuring that the transfer function Gc(s) between the output current deviation $\Delta i_m{}^*$ and the q-axis current amend command $\Delta i_q{}^*$ is an integral characteristic realizes stable control of the output current $i_m$. Thus, the arithmetic operator of the transfer function Gc(s) can be represented as an integral control section by Formula (29).

$$Gc(s) = \frac{V_{dc}(1-\sin\theta_\phi)}{2\omega} \frac{\omega_{AIC}}{s} \quad (29)$$

In Formula (29), $\omega_{AIC}$ denotes control response [rad/s] of the current limitation section 23, and Vdc denotes DC bus line voltage [v (volts)]. It is noted that $\omega_{AIC}$ is a setting parameter. From Formula (29), an integral gain of the transfer function Gc(s) can be represented by Formula (30).

$$K_i = \frac{V_{dc}(1-\sin\theta_\phi)}{2\omega} \cdot \omega_{AIC} \quad (30)$$

Thus, the current limitation section 23 multiplies the output current deviation $\Delta i_m{}^*$, which is a deviation between the current limitation command $i_m{}^*$ and the output current $i_m$, by an integral gain $K_i$, which is shown in Formula (30), and integrates the product, thereby generating the q-axis current amend command $\Delta i_q{}^*$. Then, as described above, the current limitation section 23 lowers the speed command value co in accordance with the output current deviation $\Delta i_m{}^*$, while at the same time performing q-axis current control based on the q-axis current command $i_q{}^*$, which results from subtraction of the q-axis current amend command $\Delta i_q{}^*$ by the subtraction section 25. This inhibits great changes in the output current $i_m$ as early as possible.

The current limitation section 23 is thus configured, and the integral gain $K_i$ of the current limitation section 23 changes in accordance with the power factor $\theta_\phi$. A specific operation is that when the power factor $\theta_\phi$ is high, the gain becomes low, while when the power factor $\theta_\phi$ is small, the gain becomes high. In FIG. 9, the $V_{d\_lim}{}^{}$ and the $V_{q\_lim}{}^{}$ to be input into the current limitation section 23 are voltage commands respectively for the d-axis voltage command $v_d{}^{}$ and the q-axis voltage command $v_q{}^{}$ after the saturation limiting processing.

In both the first embodiment and the second embodiment, the position detection section 4 is used to detect the rotor electrical angle phase $\theta$ of the motor 3. This, however, should not be construed in a limiting sense. A configuration without the position detection section is also possible, in which case an arithmetic operation is performed for the rotor electrical angle phase $\theta$ based on the output current and the output voltage.

Obviously, numerous modifications and variations of the present disclosure are possible in light of the above teachings. It is therefore to be understood that within the scope of the appended claims, the present disclosure may be practiced otherwise than as specifically described herein.

What is claimed as new and desired to be secured by Letters Patent of the United States is:

1. A controller of an AC motor, the controller comprising:
    a d-axis voltage command section configured to generate a d-axis voltage command on a d axis of a d-q coordinate system, the d axis being parallel to a flux of the AC motor and orthogonal to a q axis of the d-q coordinate system;
    a d-axis non-interactive control section configured to remove, from the d-axis voltage command, an interference component resulting from a current on the q axis;
    a first current deviation arithmetic section configured to perform an arithmetic operation to obtain a q-axis current deviation between a current command on the q axis and the current on the q axis flowing through the AC motor;
    a q-axis integral control section configured to receive the q-axis current deviation and output an integral value of the q-axis current deviation;
    a q-axis voltage command section configured to generate a q-axis voltage command on the q axis based on the q-axis current deviation and configured to output the q-axis voltage command;
    a constant output control section configured to receive an amount equivalent to a voltage saturation on the q-axis by removing an induced voltage constant error and an amount equivalent to a voltage drop that is due to a coil resistance of the AC motor from an output of the q-axis integral control section, the constant output control section being configured to output a correction voltage command relative to the d-axis voltage command based on the amount equivalent to the voltage saturation on the q-axis; and
    a d-axis voltage command correction section configured to subtract the correction voltage command from the d-axis voltage command after the d-axis non-interactive control section has performed non-interactive control, so as to correct the d-axis voltage command.

2. The controller according to claim 1,
    wherein the d-axis voltage command section comprises
        a second current deviation arithmetic section configured to perform an arithmetic operation to a d-axis current deviation between a current command on the d axis and a current on the d axis flowing through the AC motor,
        a d-axis integral control section configured to receive the d-axis current deviation and output an integral value of the d-axis current deviation, and
        a limiter configured to limit an output upper limit value of the d-axis integral control section, and
    wherein the d-axis voltage command section is configured to generate the d-axis voltage command based on an output of the d-axis integral control section and configured to output the d-axis voltage command.

3. The controller according to claim 2, wherein the constant output control section comprises a gain characteristic that is inversely proportional to at least one of an output frequency of each of the voltage commands and to an electrical-angle rotational frequency of the AC motor.

4. The controller according to claim 3, wherein the constant output control section comprises at least one of a PI control section and a PID control section.

5. The controller according to claim 2, wherein the constant output control section comprises at least one of a PI control section and a PID control section.

6. The controller according to claim 2, further comprising a current limitation section configured to, when a current among the currents flowing through the AC motor exceeds a limit value, lower at least one of an output frequency of each of the voltage commands and an acceleration-deceleration rate of the output frequency based on a deviation between the limit value and the current flowing through the AC motor, and configured to lower the current command on the q axis.

7. The controller according to claim 1, wherein the constant output control section comprises a gain characteristic that is inversely proportional to at least one of an output frequency of each of the voltage commands and to an electrical-angle rotational frequency of the AC motor.

8. The controller according to claim 7, wherein the constant output control section comprises at least one of a PI control section and a PID control section.

9. The controller according to claim 7, further comprising a current limitation section configured to, when a current among the currents flowing through the AC motor exceeds a limit value, lower at least one of an output frequency of each of the voltage commands and an acceleration-deceleration rate of the output frequency based on a deviation between the limit value and the current flowing through the AC motor, and configured to lower the current command on the q axis.

10. The controller according to claim 1, wherein the constant output control section comprises at least one of a PI control section and a PID control section.

11. The controller according to claim 10, further comprising a current limitation section configured to, when a current among the currents flowing through the AC motor exceeds a limit value, lower at least one of an output frequency of each of the voltage commands and an acceleration-deceleration rate of the output frequency based on a deviation between the limit value and the current flowing through the AC motor, and configured to lower the current command on the q axis.

12. The controller according to claim 1, further comprising a current limitation section configured to, when a current among the currents flowing through the AC motor exceeds a limit value, lower at least one of an output frequency of each of the voltage commands and an acceleration-deceleration rate of the output frequency based on a deviation between the limit value and the current flowing through the AC motor, and configured to lower the current command on the q axis.

13. The controller according to claim 1, further comprising;
a q-axis non-interactive control section configured to remove, from the q-axis voltage command, an interference component resulting from a current on the d axis by using an induced voltage constant; and
a voltage error compensation section configured to obtain the induced voltage constant error based on result from subtracting the amount equivalent to the voltage drop from the output of the q-axis integral control section in non-saturation state of an output voltage to the AC motor.

* * * * *